(12) United States Patent
Sasamoto

(10) Patent No.: US 7,182,167 B2
(45) Date of Patent: Feb. 27, 2007

(54) HYBRID PROPULSION SYSTEM FOR TWO-WHEELED VEHICLE

(75) Inventor: Shinji Sasamoto, Shizuoka-ken (JP)

(73) Assignee: Yamaha Motor Co., Ltd., Shizuoka (JP)

( * ) Notice: Subject to any disclaimer, the term of this patent is extended or adjusted under 35 U.S.C. 154(b) by 0 days.

(21) Appl. No.: 11/075,124

(22) Filed: Mar. 8, 2005

(65) Prior Publication Data

US 2005/0211481 A1 Sep. 29, 2005

(30) Foreign Application Priority Data

Mar. 8, 2004 (JP) .............................. 2004-063899

(51) Int. Cl.
*B62D 61/02* (2006.01)
*B60K 1/00* (2006.01)

(52) U.S. Cl. ..................... 180/219; 180/291; 180/298

(58) Field of Classification Search ................ 180/219, 180/220, 230, 65.2, 65.6, 69.6, 227, 297, 180/298, 291; 477/167, 181; 192/105 CD, 192/52.1; 474/93, 144, 150; 123/185.1, 123/41.72
See application file for complete search history.

(56) References Cited

U.S. PATENT DOCUMENTS

| | | | | |
|---|---|---|---|---|
| 4,505,352 A | * | 3/1985 | Onda et al. ................ | 180/219 |
| 4,631,469 A | * | 12/1986 | Tsuboi et al. ................ | 322/42 |
| 4,763,538 A | * | 8/1988 | Fujita et al. ................ | 180/219 |
| 4,830,163 A | * | 5/1989 | Miyazaki et al. ..... | 192/105 CD |
| 6,109,127 A | * | 8/2000 | Liau ........................... | 180/220 |
| 6,155,366 A | | 12/2000 | Lin et al. | |
| 6,267,700 B1 | * | 7/2001 | Takayama .................... | 474/93 |
| 6,341,659 B1 | * | 1/2002 | Ibukuro ...................... | 180/219 |
| 6,412,451 B2 | * | 7/2002 | Kuga et al. ............. | 123/41.72 |
| 6,505,581 B2 | * | 1/2003 | Niizuma et al. ....... | 123/41.82 R |
| 6,663,524 B2 | * | 12/2003 | Gu et al. .................... | 180/65.2 |
| 6,808,465 B2 | * | 10/2004 | Kuga et al. ................. | 180/227 |
| 2001/0034280 A1 | * | 10/2001 | Kuga et al. ..................... | 474/8 |
| 2003/0098188 A1 | | 5/2003 | Gu et al. | |
| 2003/0230442 A1 | * | 12/2003 | Huang et al. .............. | 180/65.6 |
| 2005/0090371 A1 | * | 4/2005 | Nakajima et al. ........... | 477/181 |

FOREIGN PATENT DOCUMENTS

| | | |
|---|---|---|
| DE | 102 18 140 A1 | 11/2003 |
| EP | 1 270 302 A2 | 1/2003 |
| JP | 08-175474 A | 7/1996 |
| JP | 2000-013913 A | 1/2000 |
| JP | 2003-191761 | 7/2003 |

OTHER PUBLICATIONS

European Search Report of EP Application No. EP 05 00 5068 dated Sep. 21, 2006.

* cited by examiner

*Primary Examiner*—Hau Phan
(74) *Attorney, Agent, or Firm*—Knobbe, Martens, Olson & Bear, LLP

(57) ABSTRACT

A hybrid-type unit for a two-wheeled vehicle can include an engine, a motor for driving a wheel of a vehicle, a power distribution mechanism, and a generator. The generator and the motor can be disposed at different positions offset longitudinally from each other and offset from the power output shaft of the engine.

20 Claims, 11 Drawing Sheets

HYBRID PROPULSION SYSTEM FOR TWO-WHEELED VEHICLE

PRIORITY INFORMATION

This application is based on and claims priority under 35 U.S.C. § 119 to Japanese Patent Application No. 2004-063899, filed on Mar. 8, 2004, the entire contents of which is hereby expressly incorporated by reference.

BACKGROUND OF THE INVENTION

1. Field of the Invention

The present inventions relate to two-wheeled vehicles, and more particularly to hybrid type two-wheeled vehicles including motorcycles and scooters with a drive wheel that is driven by both an engine and an electric motor mounted on the vehicle.

2. Description of the Related Art

In conventional automobiles, motorcycles, scooters, etc., at least one wheel is driven by an internal combustion engine. More recently, however, environmental issues have been regarded as important and it has become more desirable that pollutants discharge from internal combustion engines driven vehicles should be reduced. Thus, the so-called "hybrid vehicle" has become more popular. In these "hybrid vehicles," a drive motor for driving at least one wheel as mounted together with an internal combustion engine to drive the wheel.

In a parallel type hybrid vehicle, the drive wheels can be driven by at least one of an internal combustion engine and an electric motor (i.e., the internal combustion engine alone, the electric motor alone, or both). In this parallel-type system, the electric motor can be used to regenerate electricity for storage in a battery. Additionally, when the electric motor alone is driving the drive wheels, the battery is discharged to drive the electric motor.

In "series" type hybrid vehicles, an electric generator is driven by an internal combustion engine and the electric drive motor is used to drive a driven wheel of the vehicle with only electric power. Other types of hybrid vehicles also exist.

An example of the parallel type hybrid system for four-wheeled automobiles is disclosed in Japanese Patent Publication No. 2003-191761. In this system, a drive unit includes an engine, a generator, a powered distribution mechanism for distributing drive force of the engine to the generator and the drive wheel, and the motor for driving the drive wheel with electric power generated by the generator. Each of these units are disposed on the same axis in series laterally across the vehicle.

SUMMARY OF THE INVENTION

An aspect of at least one of the embodiments disclosed herein includes the realization that when adopting a parallel-type hybrid system for use on a two-wheeled vehicle, a component of the hybrid system can be disposed in a recess that is normally found on a conventional vehicle such as a motorcycle. In a conventional two-wheeled vehicle, a mounting space for the drive unit is limited to the area between the front and rear wheels and under the seat thereof. Additionally, two-wheeled vehicles are narrow as compared to an automobile. Thus, it is difficult to fit a hybrid drive unit into a two-wheeled vehicle.

Thus, one space that can be utilized for a component of a hybrid drive system on a two-wheel vehicle is a recess that is normally disposed on a forward side of a portion of the transmission of a motorcycle.

Thus, in accordance with an embodiment, a motorcycle comprises a power shaft rotated by an engine. A generator is configured to generate electricity through rotation of the power shaft. A drive wheel driven through rotation of the power shaft. A power distribution unit disposed on the power shaft and configured to distribute drive force of the engine from the power shaft to the generator and to the drive wheel. Additionally, a motor is configured to rotate the drive wheel with electric power of the generator, wherein the power shaft is disposed perpendicular to the direction of travel of the motorcycle, and at least one of the generator and the motor is disposed at a longitudinally different position on the motorcycle with respect to the power distribution unit.

BRIEF DESCRIPTION OF THE DRAWINGS

The above-mentioned and the other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

Figure 1:
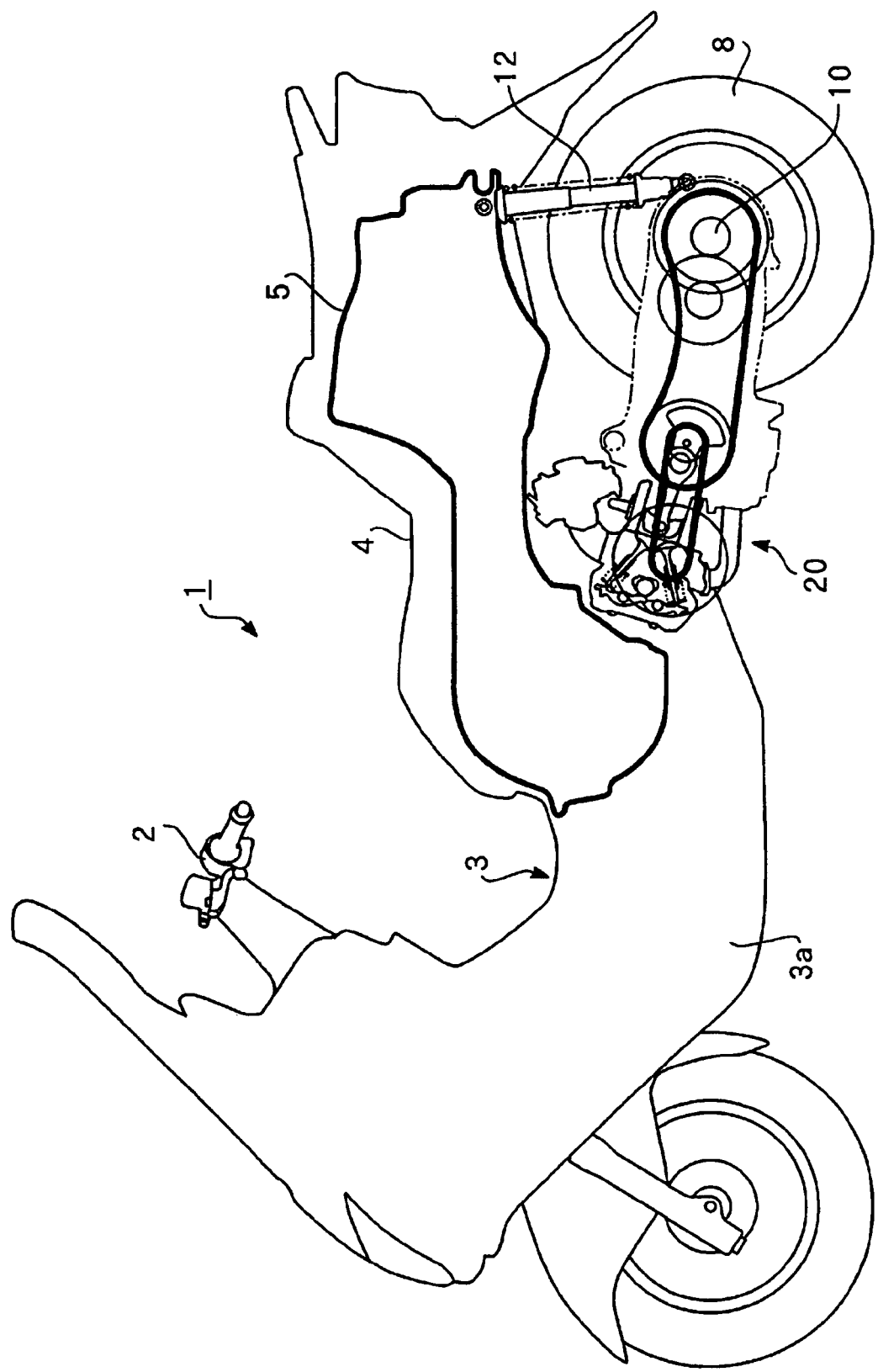
FIG. 1 is a schematic left-side view of a scooter-type two-wheel vehicle including a parallel type hybrid drive unit in accordance with an embodiment.

FIG. 1 is a schematic left side elevational view of a scooter-type two-wheel vehicle having a parallel hybrid drive unit in accordance with an embodiment. The embodiments disclosed herein are described in the context of a scooter-type two-wheel vehicle because these embodiments have particular utility in this context. However, the embodiments and inventions herein can also be applied to other vehicles, such as motorcycles, all train vehicles and other vehicles with more than two wheels which have limited space to accommodate a propulsion system.

As used herein, the terms "front," "rear," "left," "right," "up" and "down," correspond to the direction assumed by a driver of the vehicle 1. Also, the vehicle 1 in this embodiment is described as being a scooter-type motorcycle (hereinafter referred to as a "scooter-type two-wheeled vehicle") with a hybrid type drive unit.

As noted above, FIG. 1 is a schematic left side elevational view of a scooter-type two-wheeled vehicle 1 according to an embodiment. The scooter-type two-wheeled vehicle 1 is of a tandem type, i.e., configured for two riders (an operator and a passenger). The vehicle 1 includes a vehicle body 3 supporting a handlebar 2 toward a front end thereof and configured for a rotation about the steering axis. Toward a rear end of the vehicle 1, a tandem seat 4 is provided. The tandem seat 4 is mounted above a trunk space 5 and is configured for opening and closing so as to allow access to the space 5. Below the trunk space 5 is disposed a drive unit 20.

The drive unit 20 is attached to the rear end of a forward body 3A that extends rearwardly from below the handlebar 2 to a region below the tandem seat 4. The forward end of the drive unit 20 can be attached to the forward body 3A to a pivot shaft (not shown), so as to allow the drive unit 20 to swing up and down. As such, and as described below in greater detail, the drive unit 20 forms a part of the suspension of the vehicle 1. However, other configurations are also possible.

A rear wheel 8 is mounted to the drive unit 20 at the rear end of the vehicle 1 with an axle 10. A rear suspension 12 is suspended between the rear end of a frame pivot supporting the rear end of the trunk space 5. Upwardly and forwardly from the drive unit 20, a forward end of the trunk space 5 is disposed.

Figure 2:
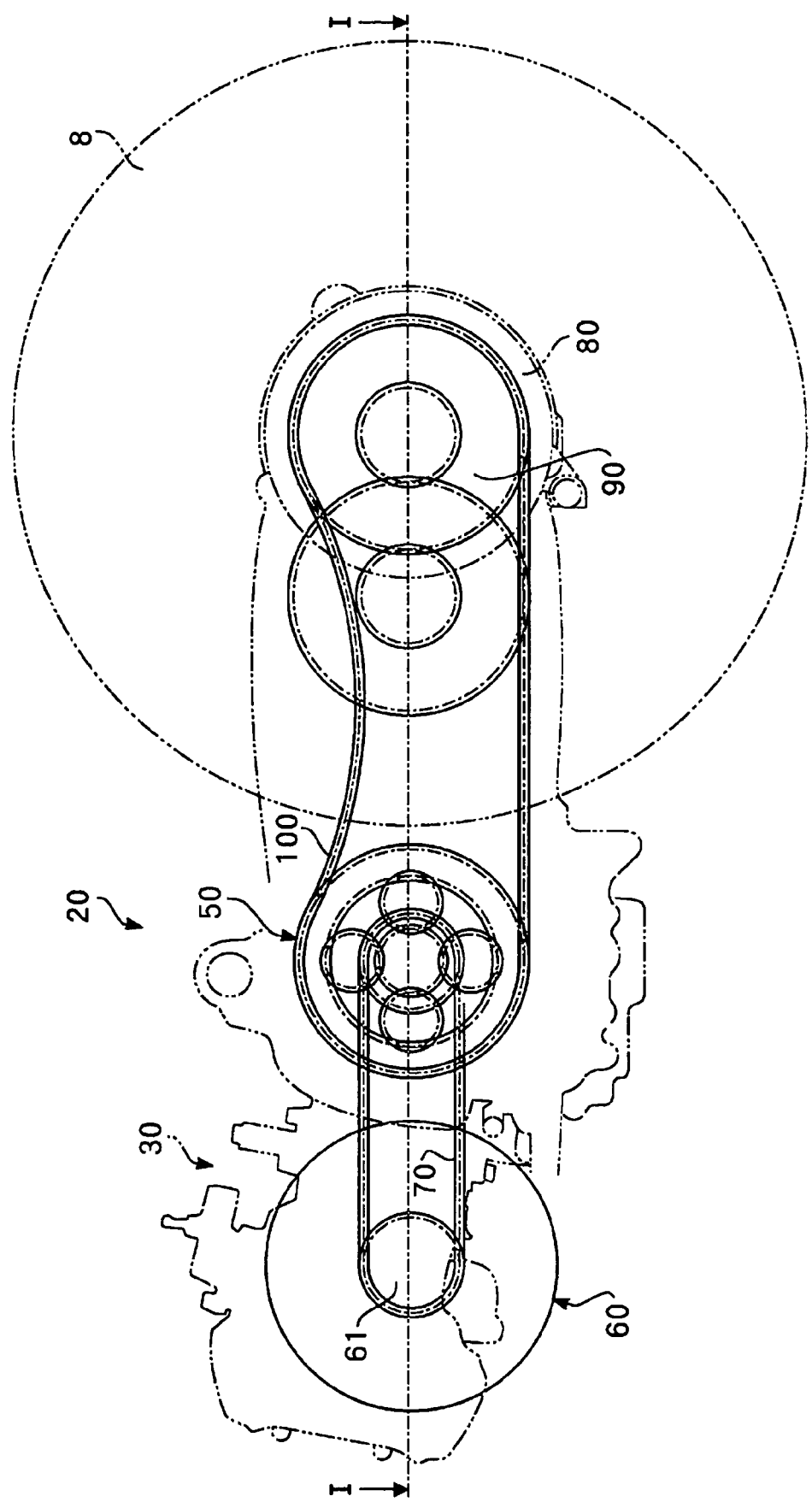
FIG. 2 is an enlarged left-side elevational view of the hybrid unit of FIG. 1.
Figure 3:
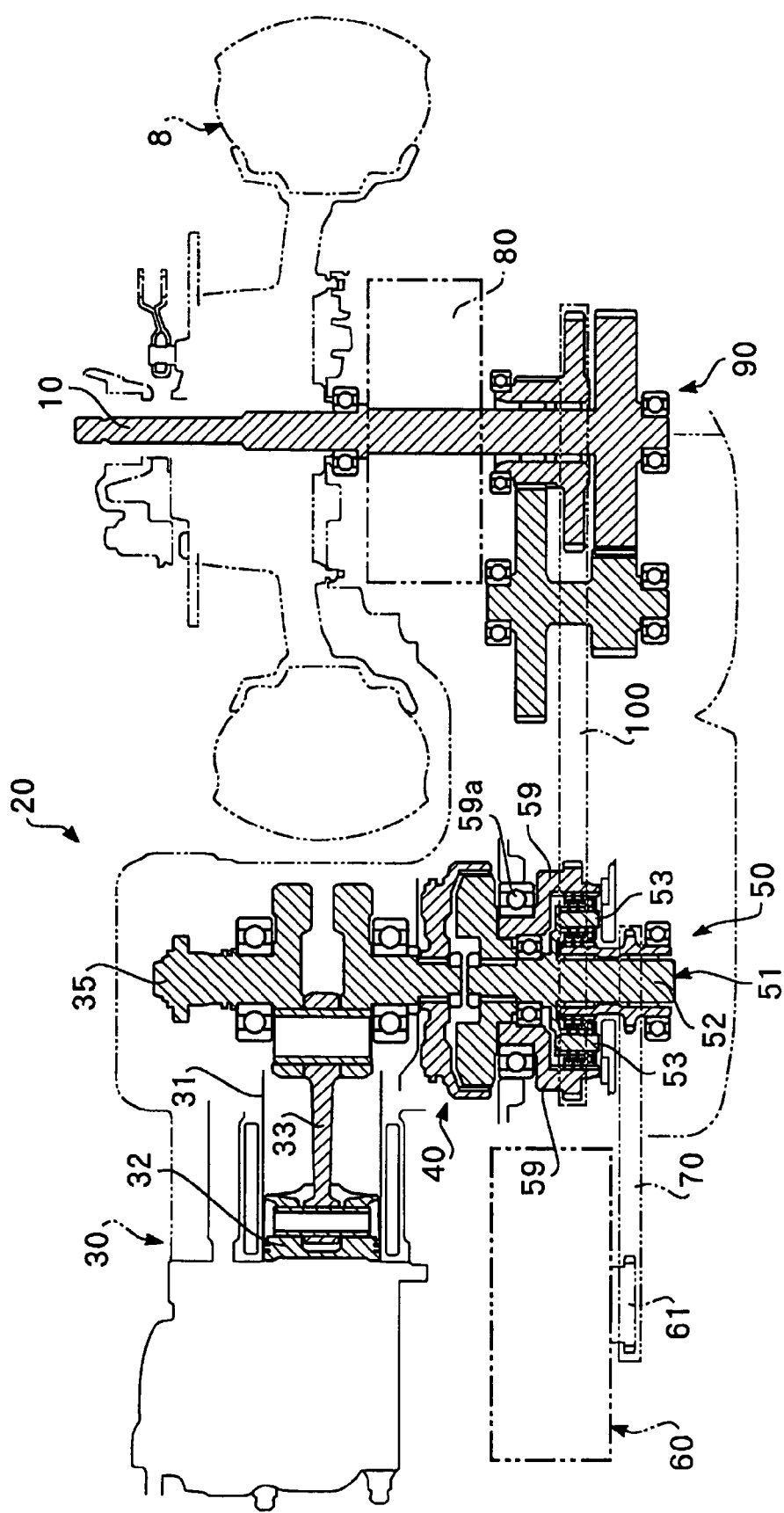
FIG. 3 is a cross-sectional view of the hybrid drive unit of FIG. 2 taken along line I—of FIG. 2.

As shown in FIGS. 2 and 3, the drive unit 20 includes an engine 30 and a motor 80 to drive the axle 10 of the rear wheel 8, as well as a power distribution mechanism 50 and a generator 60.

The engine 30 is disposed downwardly from the trunk space 5 and approximately in the longitudinal middle of the vehicle 1. The axis of the cylinder 31 of the engine 30 is disposed approximately horizontally. The crankshaft 35 of the engine 30 is disposed approximately parallel to the lateral direction of the vehicle.

The piston 32 in the cylinder 31 is connected to the crankshaft 35 through a connecting rod 33. Thus, the up and down movement of the piston 32 causes the crankshaft 35 to rotate, and conversely, the piston 32 can be moved up and down in the cylinder 31 through the rotation of the crankshaft 35.

The crankshaft 35 is disposed approximately co-axially with a shaft 52 at a planetary carrier 51 of the power distribution mechanism 50. The crankshaft 35 is connected to the shaft 52 through a collection mechanism 40.

Drive forces from the engine are transmitted to the generator 60 on the axle 10 through the power distribution mechanism. In the following description of the drive forces from the engine 30 transmitted through the power distribution mechanism 50, the power transmitted to the generator 60 is referred to as a "generator's life force" and the forces transmitted to the axle 10 are referred to as "vehicle drive forces."

The generator 60 can be disposed adjacent to the cylinder 32 of the engine 30 and forwardly from the power distribution mechanism 50. That is, the generator 60 can be provided a side of the cylinder 32 in a recess or vacant space in front of the crankshaft 35 and falls in front of the shaft 52 of the planetary carrier 51.

A rotor shaft 61 of the generator 60 extends outwardly from the generator 60. A chain 70 or any other type of flexible transmitter, can be wrapped around the shaft 61 so as to allow a drive force to be transmitted from the power distribution mechanism 50 to the generator 60. The shaft 61 can include a sprocket to receive forces from the chain 70. However, where other types of flexible transmitters are used, the sprocket 61 can be modified to cooperate with such a transmitter, as is well known in the art.

The generator 60 is configured to generate electricity through the rotation of the rotor shaft 61 to supply the generator electric power to a battery (not shown) and the motor 80. In accordance with the parallel hybrid type of propulsion system, the generator 60 can also function as a motor powered by the battery, thereby transmitting power to the power distribution mechanism 50 as well as the function of the generator for generating electricity to be stored in the battery.

For example, when the amount of charge of the battery is smaller than a given value, the generator 60 can act as a starter motor for starting engine 30. In this mode of operation, forces from the generator 60 are transmitted to the engine 30 through the power distribution mechanism 50 to rotate the crankshaft 35 and thus start the engine.

During deceleration or braking, the generator 60 can act as a braking motor for generating a resistance force to suppress rotation of the axle 10 in the running direction of the vehicle 1. In this mode of operation, the generator 60 generates electrical power that can be stored in the battery by applying the braking force to the chain 70 through the rotor shaft 61. The battery stores the electric power supplied from the generator 60 and can also supply the electric power to the motor 80.

The motor 80 is disposed in close proximity to and at the left side of the rear wheel 8. The rotary shaft of the motor 80 is positioned on the same axis of the axle 10 of the rear wheel 8. For example, it may be arranged such that the rotary shaft of the motor 80 is formed in a cylindrical shape. In this arrangement, the axle 10 can be inserted into the rotary shaft of the motor 80 for rotation together.

On the left side of the motor 80 is disposed a speed reducer 90, through which drive forces from the motor 80 can be transmitted to the axle 10. The speed reducer 90 can be formed with a sprocket. A chain 100, or another type of flexible transmitter, can be wrapped around the sprocket in the power distribution mechanism 50.

Vehicle drive forces from the distribution mechanism 50 are transmitted through the train 100 to the gear reducer 90. The gear reducer 90 transmits the drive force to the axle 10 for rotating the rear wheel 8.

With reference to FIG. 4A, the power distribution mechanism is configured to divide forces from the engine 30 into a vehicle drive force for driving the rear wheel 8 in a generator drive force for power generation by the generator 60.

Figure 4:
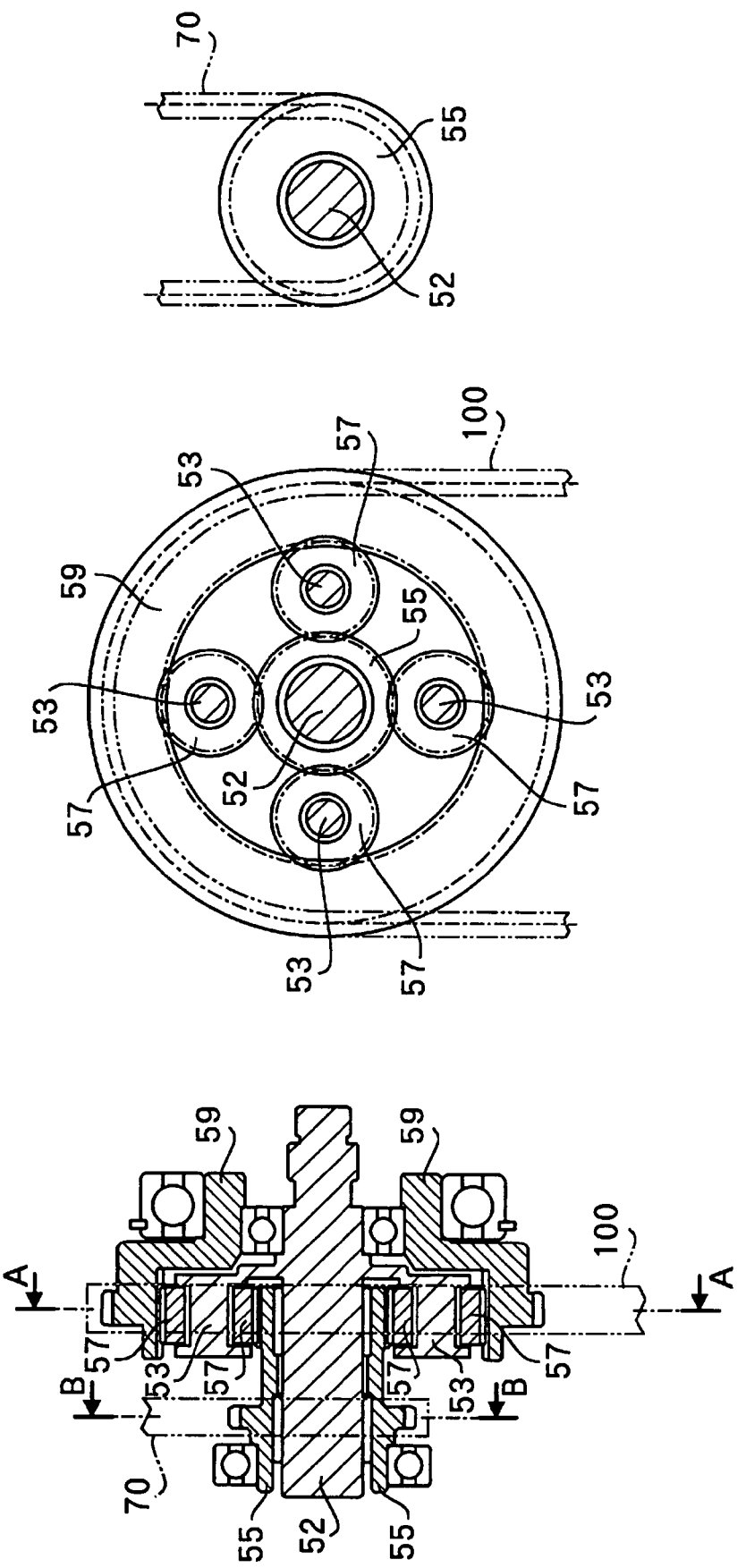
FIG. 4A is an enlarged sectional view of a power distribution mechanism of FIG. 3A.
FIG. 4B is a sectional view of a power distribution mechanism of FIG. 4A taken along line A—A.
FIG. 4C is another cross-sectional view of the power distribution mechanism of FIG. 4A taken along line B—B.

As shown in FIGS. 2–4, the shaft 52 connected to the crankshaft 35 can be formed integrally with a flange protruding from the outside circumference of the shaft 32. On one side of the flange are provided for planetary pins 53. The pins 53 can extend generally parallel to the shaft 52 and can be disposed concentrically around the shaft 52.

The planetary pins 53 carry planetary gears 57 for rotation therearound. The planetary gears 57 can be meshed with a cylindrical sun gear 55 fitted for rotation over the shaft 52 on one side of the flange. That is, the planetary gear 57 rotate on their own axes (defined by the planetary pins 53) while they are rolling around the sun gear 55. The sun gear 55 can be formed integrally with a sprocket, over which can be stretched the chain 70 which is also wound around the rotor shaft 61 of the generator 60.

Around the four planetary gears 57 can be disposed a ring gear 59. The ring gear 59 can be meshed with each of the four planetary gears 57 along the inner circumference of the ring gear 59. The chain 100 can be wrapped around teeth defined on the outer circumference of the ring gear 59. Of course, the teeth on the outer circumference of the ring gear 59 can be formed on a separate member attached to the ring gear 59, or formed as a single component as illustrated in FIG. 4A.

In such a power distribution mechanism 50, when the shaft 52 of the planetary carrier 51 is rotated by the drive force from the crankshaft 35 of the engine 30, the four planetary pins 53 integral with the shaft 52 also rotate under shaft 52. As a result, the planetary gears 57 which are supported by the planetary pins 53 also revolve around the sun gear 55.

Both the sun gear 55 and the ring gear 59 mesh and rotate with the planetary gear 57. Therefore, rotation of the sun gear 55 is transmitted as the generating drive force to the generator 60 through the chain 70. This generating drive force drives the generator 60 so as to produce electricity.

On the other hand, rotation of the ring gear 59 is transmitted as the vehicle drive force to the axle 10 through the chain 100 and through the speed reducer 90 for driving the rear wheel 8. As noted above, as for the chains 60 and 100, any type of transmission means can be satisfactory as long as they can be configured to transmit drive forces from the sun gear 55 and the ring gear 59 to the generator 60 and the rear wheel 8. For example, a V-belt or rectangular belt can be used instead of a chain, as well as other types of flexible transmitters.

In the vehicle 1, with the drive unit 20 noted above, the rear wheel 8 is driven by at least one of the engine 30 and the motor 80 through the power distribution mechanism. At the same time, operations of the engine and the motor 80, that is, the operation of the drive unit 20 is determined according to the running conditions of the vehicle 1 or the amount of charge of the battery which can be used to drive the motor 80.

The operation of this drive unit 20 is described below for various running conditions of the vehicle 1 and for running conditions based on the amount of charge of the battery.

Figure 5:
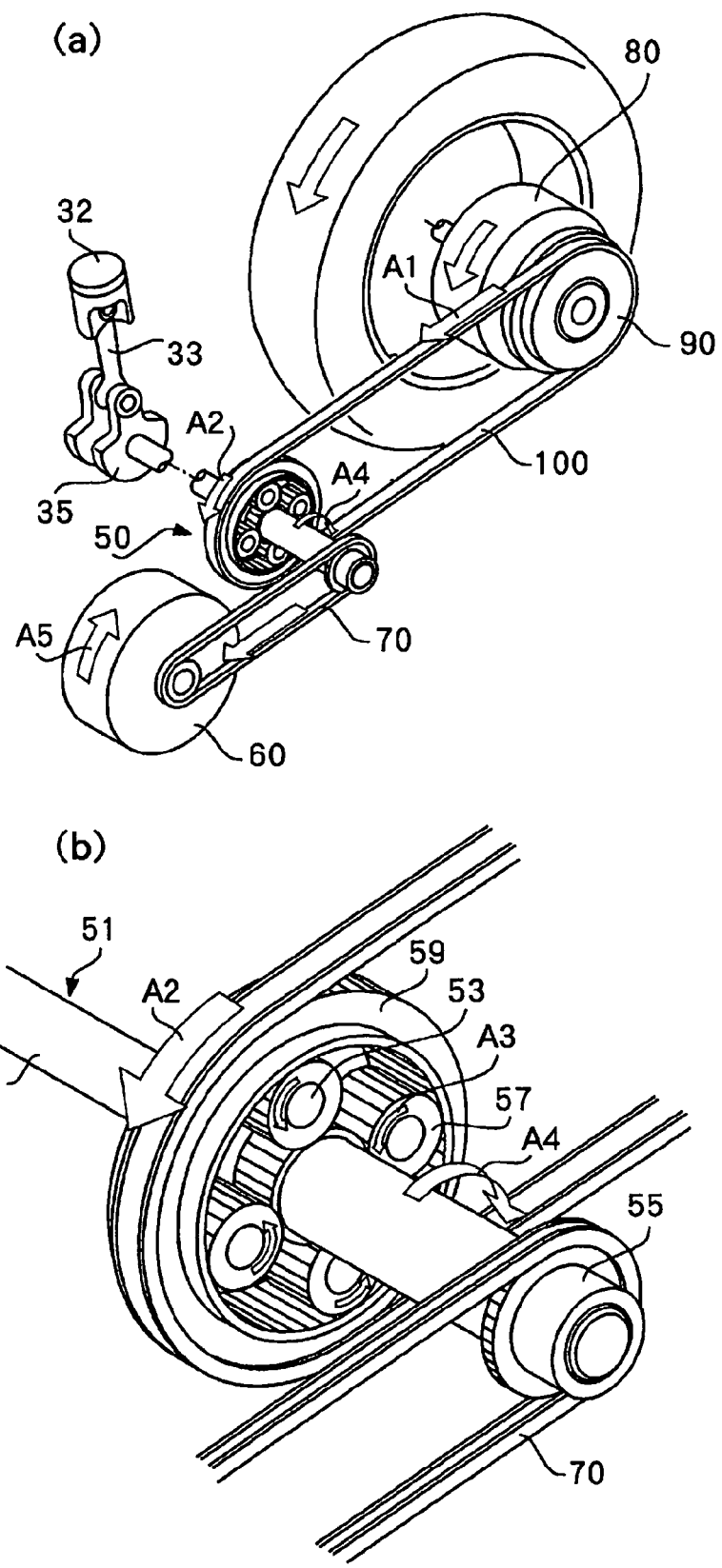
FIG. 5A is a schematic view of the interconnection of the power distribution mechanism, the crankshaft of the internal combustion engine, an electric motor, and a rear wheel drive unit of the compulsion unit shown in FIG. 1.
FIG. 5B is an enlarged prospective view of the power distribution mechanism illustrated in FIG. 5A.
Figure 6:
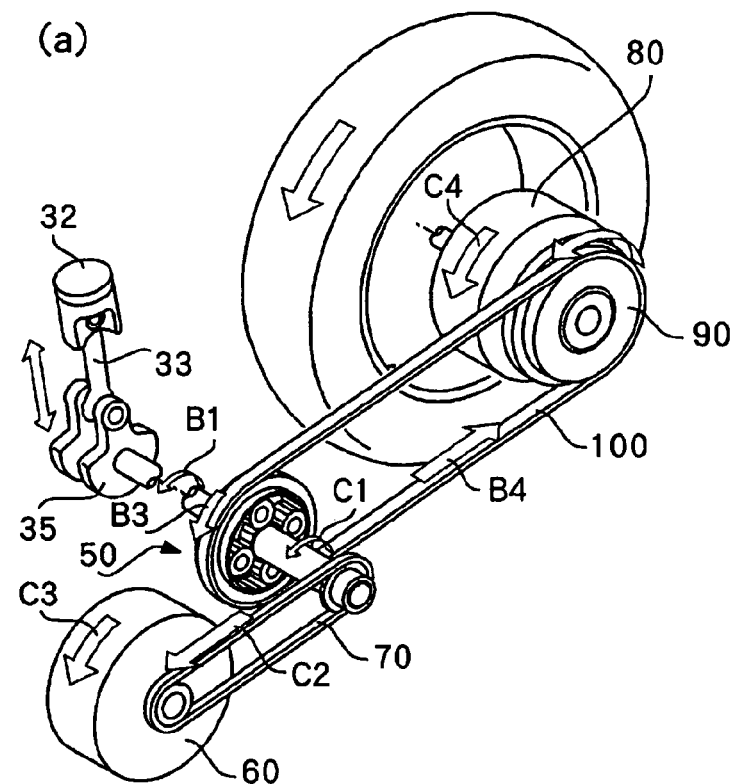
FIG. 6A is another enlarged schematic of the hybrid drive unit illustrated in FIG. 5A and illustrated in another mode of operation.
FIG. 6B is an enlarged prospective view of the power distribution mechanism of FIG. 6A illustrating another mode of operation.
Figure 6:
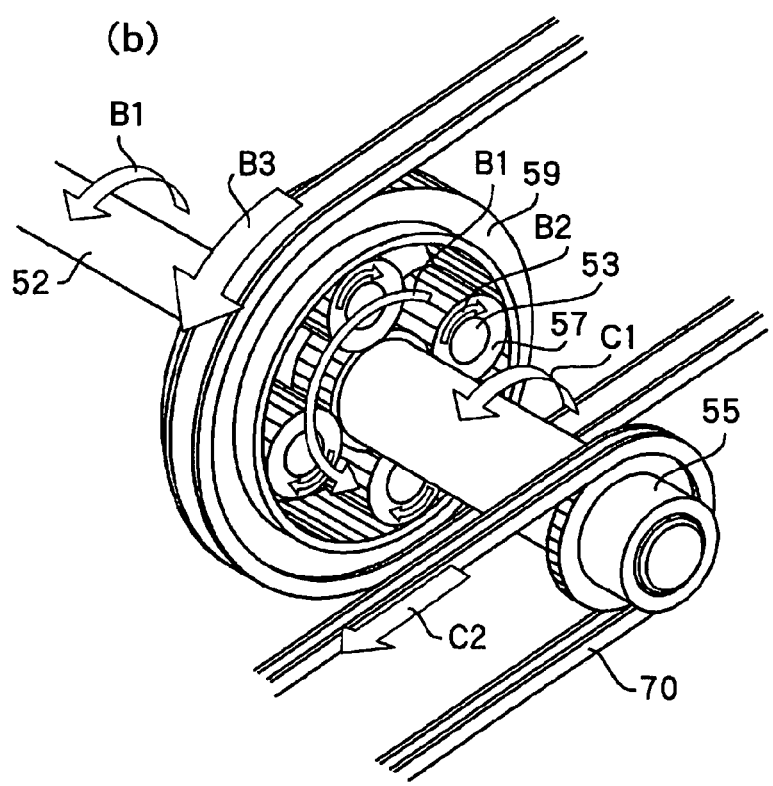

With reference to FIGS. 5 and 6, various operation modes of drive unit 20 are described. In FIGS. 5A and 6A, a perspective view of the entire drive unit 20 is shown illustrating a sequence of operations of the components within the drive unit 20. FIGS. 5B and 6B are enlarged views of the power distribution mechanism 50. The rotational directions of the components are identified by the arrows A, B, and C.

Starting and During Light Load Running

At startup and during light load running, the vehicle 1 can be started and run with just the drive force of the motor 80. This mode of operation can be used when there is a sufficient charge in the battery. Because there is a sufficient charge in the battery, e.g., the charge of the battery is at or above a predetermined value, there is no need from power from the generator 60 or the engine 30. Thus, the engine 30 can be stopped or left in a state in which it is not operating.

As shown on FIGS. 5A and 5B, the motor 80 is driven to propel the vehicle 1. The rotation of the shaft of the motor 80 causes the axle 10 to rotate through the speed reducer 90. The chain 100 is also rotated in relation to the motor 80 (identified as direction A1). Rotation of the axle 10 causes the rear wheel 8 to rotate.

The rotation of the chain 100 (in the direction of A1) causes the ring gear 59 to be rotated (in the direction of arrow A2 shown in FIG. 5B). When the ring gear 59 rotates (in the direction of A2), the planetary gears 57 are rotated (in the direction of A3) in the same direction as the rotation of the ring gear 59. Because the crankshaft 52 and thus the flange carrying the planet pins 53 is stationery, the planetary gears 57 rotate the sun gear 55 in the opposite direction, as identified by the arrow A4.

The rotation of the sun gear 55 (in the direction of A4) drives the chain 70 and thus the rotor shaft 61 of the generator 60. In this mode the sun gear 55 is rotated at a rotational speed corresponding to the number of related rotations of the chain 100 (rotations of the ring gear 59). In other words, because cranking of the engine (the condition in which revolution is transferred to the crankshaft 52 to reciprocate the piston 32), as prevented by the related rotation of the chain 100 associated with the rotation of the motor 80.

In another mode, when the motor 80 rotates, thereby causing the ring gear 59 to rotate (in the direction of A2), the planetary gears 55 can rotate on their axis while the planetary pins revolve around the sun gear 55. This revolution of the planetary pins 53 (which corresponds to the rotation of the planetary carrier 51) is transmitted to the crankshaft 35 through the shaft 52, causing the piston 32 to be reciprocated within the cylinder 31.

To prevent this movement of the piston 32, the rotor shaft 61 of the generator 60 is rotated in synchronization with the rotation of the motor 80. This rotation causes the sun gear 55 to be rotated in synchronization with the rotation of the ring gear 59 through the chain 70. Thus, since the sun gear 55 and the ring gear 59 rotate in synchronization with each other, the planetary carrier itself does not rotate. Thus, the shaft 52 does not rotate and its rotational force is not transmitted to the crankshaft 35, preventing the cranking of the engine 30.

In this mode, both the motors 80 and 60 can be used together to provide a driving force to the axle 10, without the crankshaft 35 rotating.

Steady Running

During steady running, the vehicle 1 can run on both the power of the engine 30 and the power of the motor 80. This mode generally corresponds to a running of the vehicle at a higher fuel consumption ratio of the engine. For example, the power of the engine 30 is divided by the power distribution mechanism 50 into a vehicle drive force to directly drive the rear wheel 8 and the generating drive force to drive the generator 60 for power generation. That is, the drive unit 20 operates the vehicle drive force, and the power of the motor 80 produced by the electric power generated by the generator 60 from the generating drive force.

With reference to FIGS. 6A and 6B, the rotation of the crankshaft 35 drives the shaft 52 (in the direction of B1). As noted above, the carrier 51 is connected to the shaft 52. Thus, the carrier 51 and the planetary pins 53 rotate together with the shaft 52. Thus, the planetary pins 53 also revolve around the shaft 52 (in the direction of B1). In association with the revolution of the planetary pins 53 (in the direction of B1), the planetary gear 57 rotate on the planetary pins 53 (in the direction of B2), while revolving around the shaft 52 (in the direction of B1).

In association with the rotation of the planetary gears 57 (in the direction of B2), the ring gear 59 is rotated (in the direction of B3). In association with the rotation of the ring gear 59 (in the direction of B3), the chain 100 is rotated (in the direction of B4). The rotation of the chain 100 is transmitted to the axle 10 through the speed reducer 90, to rotate the rear wheel 8.

On the other hand, the rotation of the planetary gears 57 (in the direction of B2), causes the sun gear 55, which is meshed with the planetary gears 57, to also be rotated in the opposite direction of the planetary gears 57 (in the direction of C1). In association with the rotation of the sun gear 55 (in the direction of C1), chain 70 is rotated (under the direction of C2), to rotate the rotor shaft 61 (in the direction of C3). The rotation of the rotor shaft 61 causes the generator 60 to generate electricity. The power generating force by the generator 60 is supplied to the motor 80 as electric power to drive the motor 80. The motor 80 can be rotated (in the direction of C4), to thereby rotate the rear wheel 8. Thus, the power from the engine 30 and the motor 80 are combined together to drive the rear wheel 8.

During Running when a Higher Output is Required Such as Acceleration and Climbing When higher output is required, such as during acceleration and climbing, the output of the motor 80 and the generator 60 can be combined with the output of the engine 30 to thereby provide a higher drive force to the wheel 8. For example, the drive force from the motor 80 is transmitted to the axle 10 in addition to the drive force from the engine 30 to thereby rotate the rear wheel 8. In some embodiments, electric power from the battery can be drawn from the motor 80 in addition to the electrical power it already receives from the generator 60. Thus, this higher output mode cannot be sustained indefinitely. However, oftentimes an operator of such a vehicle only needs such a higher output operation for limited circumstances. Thus, this mode can be used satisfactorily.

During Deceleration and Braking

During deceleration and braking, the propulsion unit 20 can provide some or all of the braking power. For example, the rotation of the axle 10 of the rear wheel 8 is transmitted to the engine 30 through the speed reducer 90, the chain 100, and the power distribution mechanism 50. This power transmission from the wheel 8 toward the engine 30 moves the piston 32 of the engine 30 up and down. The frictional force and compressive resistance associated with this forced up and down movement of the piston 32 provides a so-called "engine braking effect."

In some embodiments, an electric power can be supplied to the generator 60 to rotate the shaft 61. In this mode, the rotor shaft 61 drives the chain 70 in the power distribution mechanism 50 to thereby effectively change the gear way shield between the rear wheel 8 and the crankshaft 35 to thereby provide an elevated engine braking effect. Thus, engine braking is applied by the engine 30 at an elevated engine speed, to thereby enhance deceleration and braking of the vehicle 1.

Operation During Low Battery Charge

Figure 7:
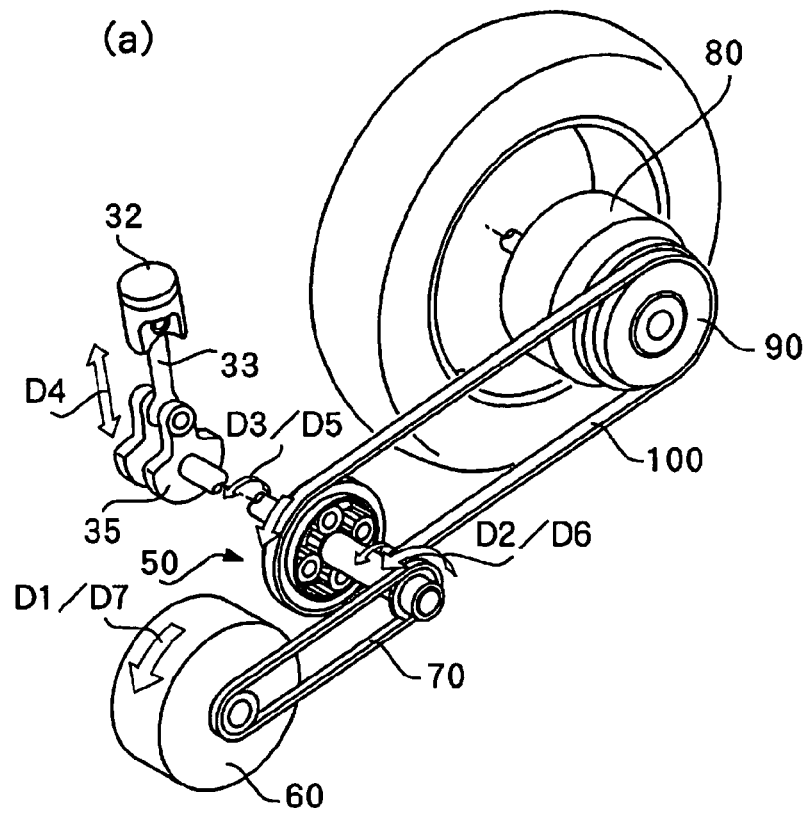
FIG. 7A is yet another prospective view of a hybrid drive unit of FIG. 5A illustrating yet another mode of operation.
FIG. 7B is an enlarged prospective view of the power distribution mechanism of FIG. 7A illustrating another mode of operation.
Figure 7:
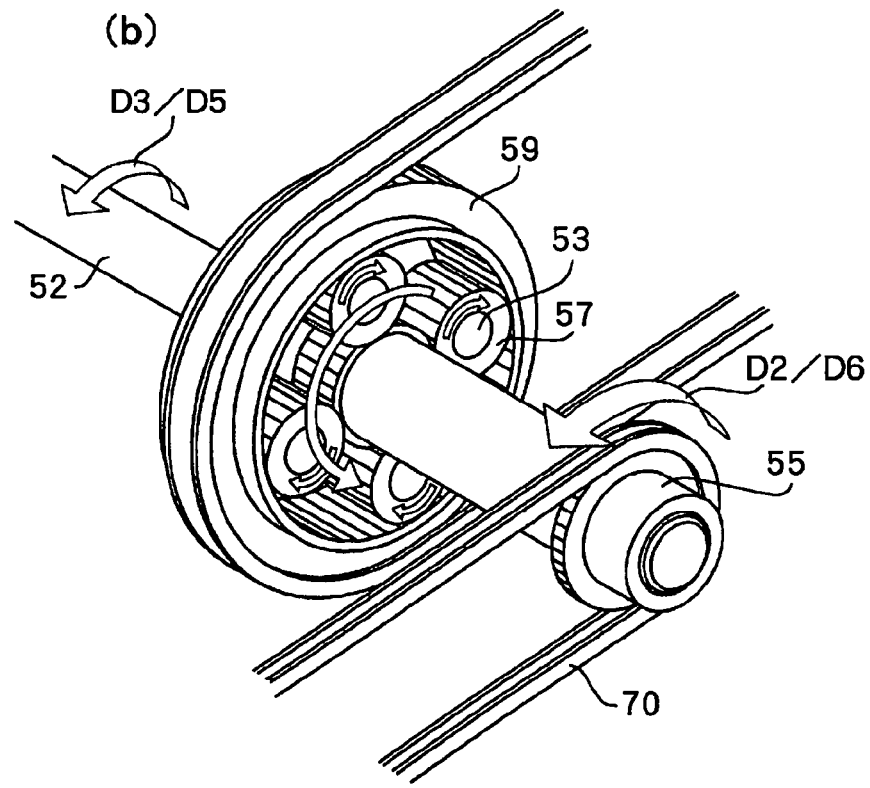
Figure 8:
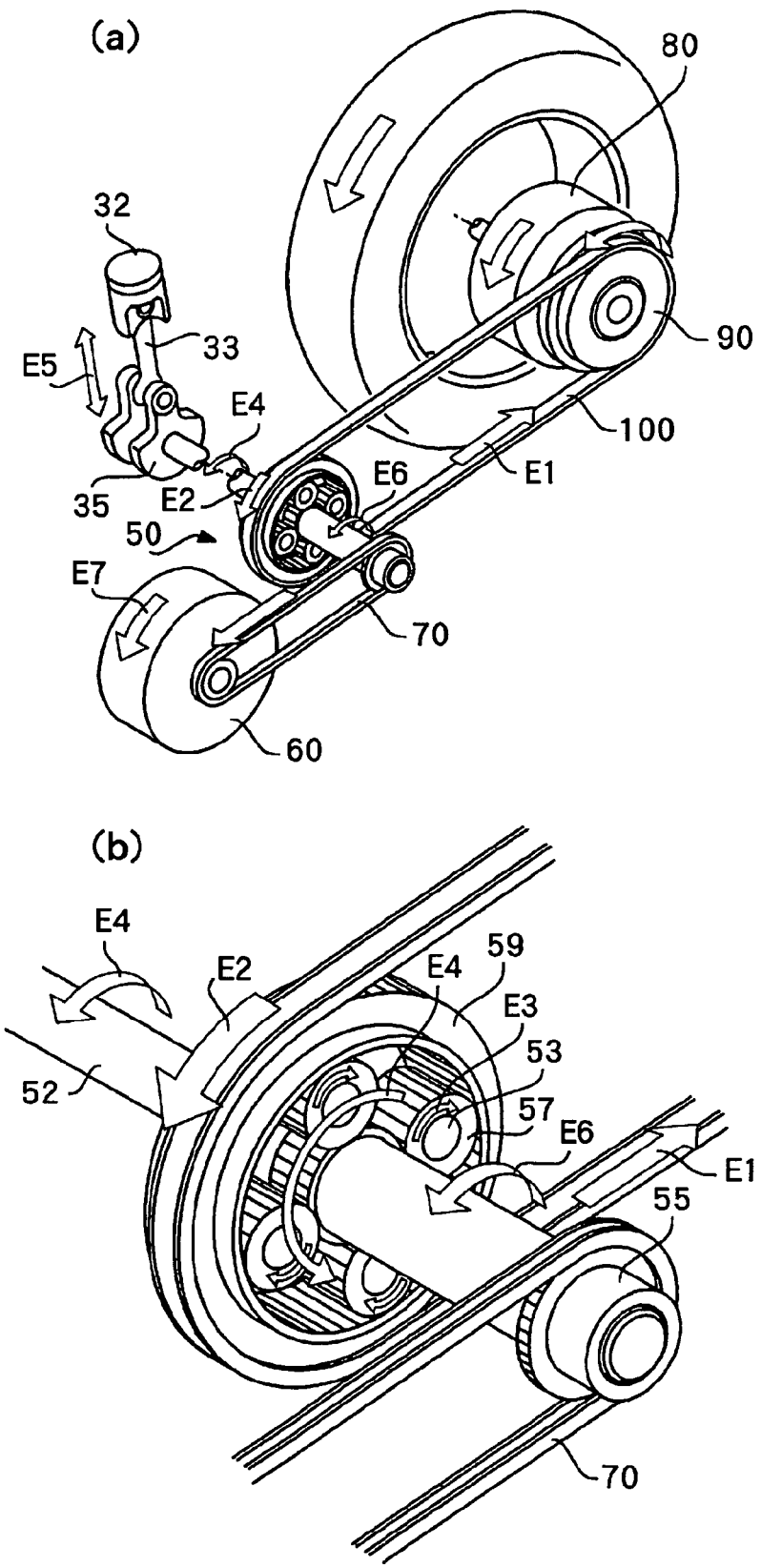
FIG. 8A is a further schematic prospective view of the hybrid unit of FIG. 5A illustrating a further mode of operation.
FIG. 8B is an enlarged prospective view of the power distribution mechanism of FIG. 8A illustrating another mode of operation.

The drive unit 20 can also be operated when the charge in the battery is at or below a given value. FIGS. 7 and 8 illustrate such operation. FIGS. 7A and 8A illustrate perspective views of the overall drive unit 20 and include arrows to illustrate the sequence of operations of some of the components in the drive unit 20. FIGS. 7B and 8B are enlarged views of the power distribution mechanism 50. The directions of rotation of the components of the drive unit 20 are identified by arrows D and D in FIGS. 7 and 8.

Idle Operation

During idling, the generator 60 can be energized with electric power stored in the battery, so as to act as a motor and start the engine. During idling of the engine, the engine drives the generator 60 through the power distribution mechanism 50. The electric power generated by the generator 60 is directed to the battery and/or supplied to the motor 80.

In this operation, as shown in FIGS. 7A and 7B, the generator 60 is energized and rotated (in the direction of D1), to act as a starter motor. The rotation of the generator 60 is transmitted to the sun gear 55 through the chain 70, to thereby rotate the sun gear 55 (in the direction of D2). In this scenario, because the vehicle 1, and thus the rear wheel is stopped, the ring gear 59 is also stopped. Thus, when the sun gear 55 rotates (in the direction of D2), the planetary gears 57 rotate on their axis while revolving around the sun gear 55. The revolution of the planetary gears 57 around the sun gear causes the carrier 51 to rotate, thereby rotating the shaft 52 (in the direction of D3). The rotation of the shaft 52 with the planetary 51 is transmitted to the crankshaft 35 through the clutch mechanism 40. As such, the force transmitted to the crankshaft 35 causes the piston 32 to reciprocate along the direction D4 to thereby start the engine.

After the engine 30 is started, with the ring gear 59 stopped, the planetary carrier 51 and the planetary gear 57 rotate (in the direction of D5).

The rotation of the planetary gears 57 is transmitted to the sun gear 55, thus rotating the sun gear 55 in the opposite direction to the planetary gears 57 (in the direction of D6). The rotation of the sun gear 55 is transmitted to the rotor shaft 61 through the chain 70, to rotate the rotor shaft 61 (in the direction of D7).

The rotation of the rotor shaft 61 causes the generator 60 to generate electricity. The generated electrical power is stored in a battery. The motor 80 can be supplied with electric power from the battery or the generator 60. With such electric power, the motor 80 can transmit a drive force to the speed reducer 90 to rotate the axle 10.

At Starting and During Light Load Running

At start up and during light load running, the battery can be used to power the motor 80. Thus, the vehicle 1 can move under the power of the motor 80 only using electric power from the battery, without the engine 30 running.

In operation, with reference to FIGS. 8A and 8B, the motor 80 can be driven with electric power from the battery to rotate the axle 10, via the speed reducer 90. This causes the vehicle 1 to begin to move. As such, the chain 100 is rotated with the axle 10 (in the direction E1), to rotate the ring gear 59 (in the direction of E2).

The rotation of the ring gear (in the direction of E2) causes the planetary gears 57 to be rotated (in the direction of E3). This rotation causes the planetary carrier 51 to be rotated (in the direction of E4). As such, because the engine 30 is already operating, and thus rotating the shaft 52 (in the direction of E5), the planetary carrier 51 is also rotated by the shaft 52.

The rotation of the planetary carrier 51 (in the direction of E4) causes the sun gear 55 to rotate as well. The rotation of the sun gear 55 (in the direction of E6) is transmitted through the chain 60 to rotate the rotor shaft 61 (in the direction of E7). Because the amount of charge of the battery is less than or equal to a predetermined amount, in this mode, the rotation of the rotor shaft 61 causes the generator 60 to generate electricity for charging the battery.

During Steady Running

When the vehicle 1 is running under a generally steady speed, even when the charge of the battery is less than a predetermined value, the vehicle 1 operates basically in the same manner as when the charge of the battery is greater than the predetermined amount. However, before the charge of the battery becomes equal to or greater than the predetermined value, electrical power obtained from the generator 60 is used to charge the battery. Additionally, this power from the generator 60 can be used to drive the motor 80.

During Running when a Higher Output is Required, Such as Acceleration and Climbing When a higher output is required in the present embodiments, such as during acceleration and climbing, the engine 30 and the motor 80 can be used together to provide a larger drive force. For example, the speed of the engine 30 can be raised or the electrical power from the battery is used to power the motor 80 together with any generator electricity from the generator 60. However, in some embodiments, electrical power from the battery is not used to drive the motor 80 until the charge of the battery becomes equal to or greater than a predetermined value. Thus, when the battery charge is insufficient, only electricity from the generator 60 is applied to the motor 80.

During Deceleration and Braking

During deceleration and braking, in the vehicle 1, the rotation of the axle 10 is transmitted to the motor 80 through the speed reducer 90, thereby causing the motor 80 to rotate. The motor 80 can be used as a generator to regenerate electricity for charging the battery. Thus, the kinetic energy of the vehicle 1, during deceleration and braking, can be converted back into electrical energy and stored in the battery. Thus, the vehicle 1 is decelerated and braked by the deceleration and braking function of the regenerated braking in the motor 80.

Because the motor 80 can be used directly as a brake and as an electrical generator, control of the engine 30 for engine braking can be eliminated. Thus, the rotor shaft 61 of the generator 60 can be controlled to rotate at a speed such that the engine is not rotated at an elevated speed.

As noted above, the vehicle 1 can be configured to change its running mode in response to the conditions and the amount of charge of the battery.

In some embodiments, although the drive unit 20 has been described above as being applied to a scooter-type two-wheeled vehicle, the inventions disclosed herein are not limited to scooters. Rather, the inventions disclosed herein can be applied to any two-wheel vehicle.

As noted above, the generator 60 and the motor 80 are disposed in different positions that are offset longitudinally on the vehicle 1 relative to the crankshaft 35 of the engine 30 and the shaft 52 of the planetary carrier 51. Thus, since the generator 60 and the motor 80 are not disposed adjacent to each other in the lateral direction of the vehicle 1, the drive unit 20 can be mounted in a compact manner on a scooter-type two-wheeled vehicle without protruding laterally from a normal shape of such a vehicle. This effect can be produced from many different arrangements where at least either one of the generator 60 of the motor 80 are disposed to offset longitudinally from the power shafts of the engine 30.

Additionally, since the generator 60 disposed in a space or recess that is in front of the power distribution mechanism 50, the limited amount of space available on such a scooter-type two-wheel vehicle 1 can be used efficiently without significantly protruding laterally from the vehicle 1.

Further, as shown on FIG. 1, the rotor shaft 61 of the generator 60, the shaft 52 of the planetary carrier 51 in the power distribution mechanism 50 and the center of the motor 80 are disposed approximately at the same height as the axle 10 of the rear wheel 8 and are generally parallel.

Thus, the drive unit 20 which can embody a large portion of the weight of the entire vehicle 1 is disposed close to the ground thus slowing the center of gravity. In the illustrated embodiments, the drive unit 20 is at about the minimum ground clearance of the vehicle 1. With such a lower center of gravity, the handling characteristics of the vehicle 1 is improved.

Further, since the drive unit 20 is disposed near the lowest components of vehicle 1, the space available for the trunk space 5 is larger thereby providing the user with additional space for carrying baggage.

Further, since the power distribution mechanism 50 is provided upstream of the speed reducer 90 in the transmission path of the drive force from the engine 30 to the axle 10, the torque exerted on the power distribution mechanism 50 can be decreased. Thus, the components of the power distribution mechanism 50 can be reduced in size and weight thereby providing a more compact arrangement of the power distribution mechanism 50. Thus, the entire drive unit 20 can be reduced in size.

Components forming the power distribution mechanism 50 can be disposed laterally opposite on the axis of the shaft 52 shown in FIG. 3. For example, as viewed in FIG. 3, the chain 100 and the chain 70 can be disposed between the clutch mechanism 40 and the power distribution mechanism 50.

In this embodiment, bearings, such as bearing 59A of the ring gear 59 and the like, for supporting components rotating on the shaft 52 can be provided. Thus, the chain 70 can be located laterally on the power shaft at a position adjacent to that of the bearing 59A shown in FIG. 3. This is because a bearing for supporting the clutch mechanism 40 is disposed at the position of the bearing 59A. Further, a bearing for the ring gear 59 can be disposed adjacent to the chain 70. The length of the power distribution mechanism 50 becomes larger in the lateral direction than that shown in FIG. 3 by as much as the areas where the bearings of the clutch mechanism and the ring gear 59 are disposed, respectively.

In this embodiment, the sprocket 61 can be disposed between the generator 60 and the engine 30. This arrangement is preferable so that a space is maintained between the engine 30 and the generator 60, to thereby allow for air circulation and thus preventing the overheating of the generator 60. In this arrangement, the lateral position of the bottom of the generator 60 is disposed away from the engine 30 further than that of the sprocket of the generator 60 shown in FIG. 3. As a result, the axial length of the power distribution mechanism 50 itself, that is, the width of the vehicle 1 at which the drive unit 20 is mounted, is increased.

Thus, because the power distribution mechanism 50 including the arrangement shown in FIG. 3 with the generator 60 disposed for the power distribution mechanism, the width of the drive unit 20 can be decreased.

Another advantage is provided by disposing the speed reducer 90 such that its center is offset from the axle 10. For example, by offsetting the speed reducer 90 such that its center is offset from the axle 10, the external appearance of the speed reducer 90 is more pleasing. Further, although the position of the motor 80 is not limited to the illustrated embodiment, the space from the side of the rear wheel can be utilized more efficiently if the motor 80 is provided as illustrated.

Further, because the rotor shaft 61 of the generator 60, the planetary carrier 51, the axle 10 and the rotor shaft of the motor 80 are disposed approximately parallel to each other, a higher transmission efficiency of the drive force can be secured.

Although the crankshaft 35 and the planetary gear 57 can be disposed offset from each other, they are preferably provided approximately on the same axis so as to achieve high efficiency of transmission of the drive force transmitted therebetween. If the crankshaft 35 and the planetary gears 57 are provided approximately on the same axis, a wider space is produced in front of the power distribution mechanism 50 and at the side of the cylinder of the engine 30. Because the generator 60 is disposed in this wide space, the space in front of the power distribution mechanism can be utilized effectively and the drive unit 20 can be mounted on the vehicle 1 without significantly protruding laterally from the vehicle 1.

Figure 9:
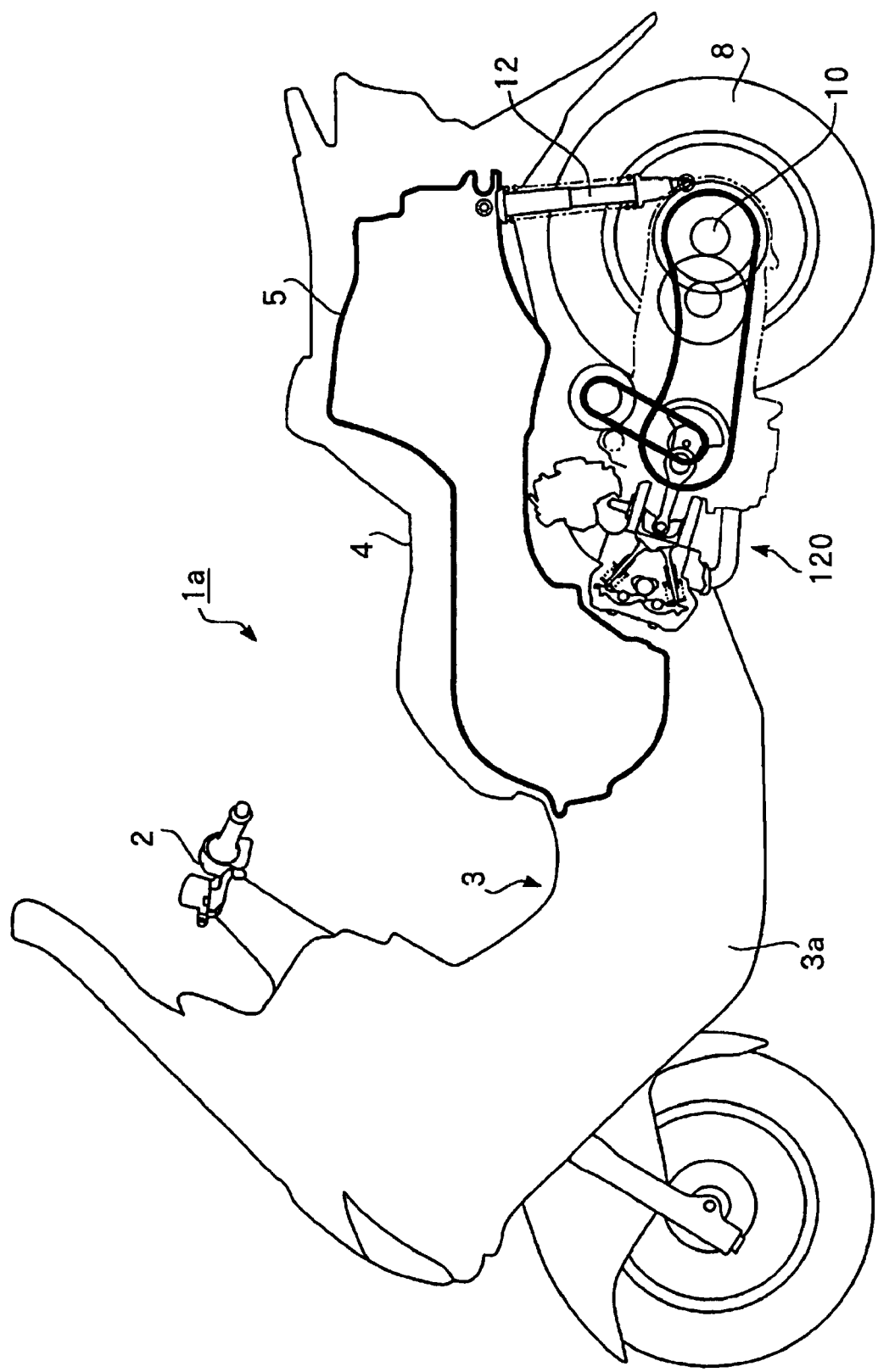
FIG. 9 is a schematic left side elevational view of the modification of the scooter and hybrid drive unit of FIG. 1.
Figure 10:
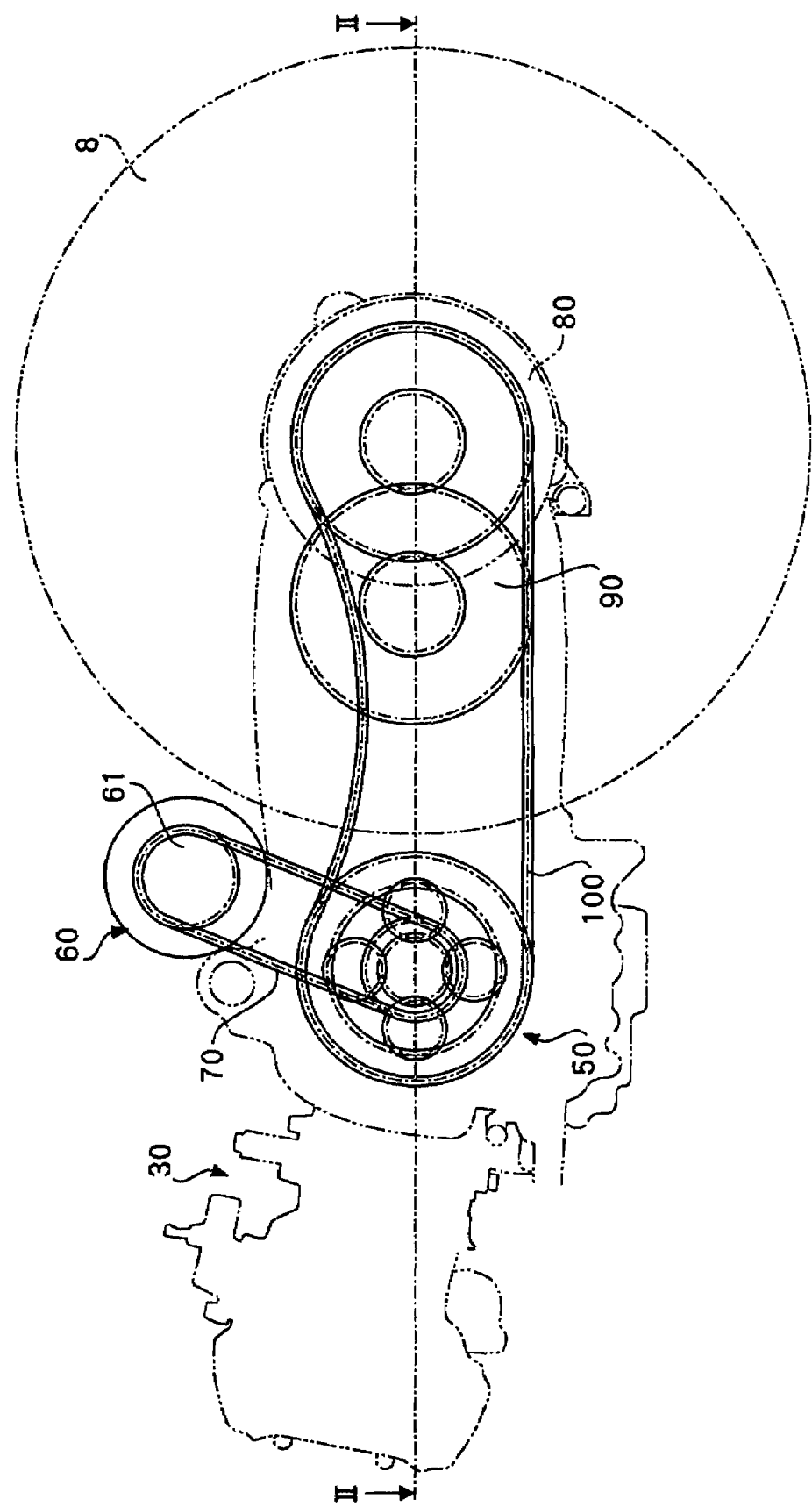
FIG. 10 is an enlarged schematic left side elevational view of the hybrid drive unit shown in FIG. 9.
Figure 11:
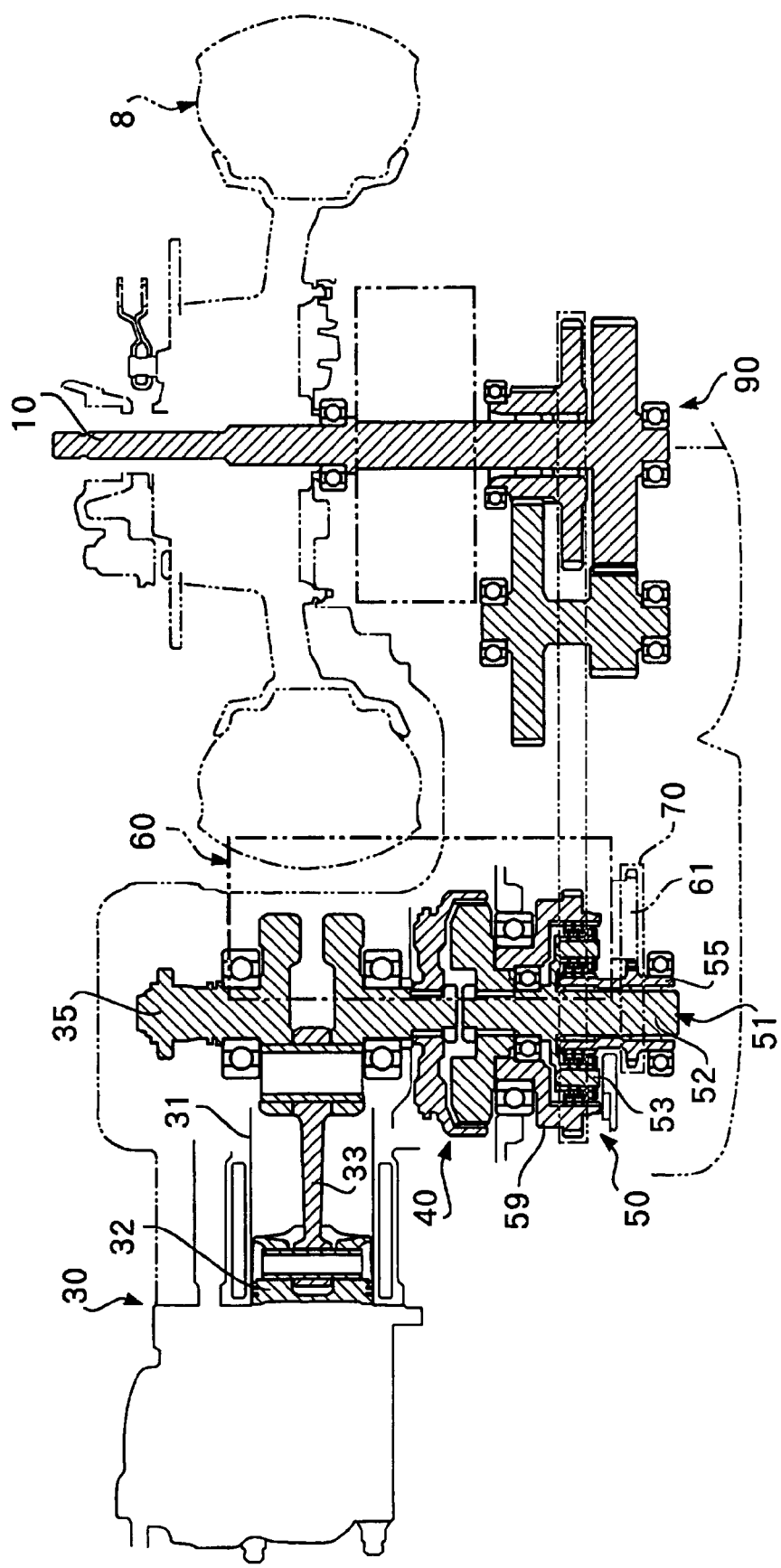
FIG. 11 is a cross-sectional view of the hybrid drive unit illustrated in FIG. 10, taken along the line II—II.

FIGS. 9 and 10 illustrate a modification of vehicle 1 and is identified generally by the reference numeral 1A. In this embodiment, the generator 60 is disposed rearwardly from the position of the generator 60 illustrated in FIGS. 1–8. Other than the position of generator 60, the construction and arrangement of the other components can be the same or similar to that as in the embodiments of FIGS. 1–8. Thus, in the following description of the embodiment of FIG. 9, the description of the components that are the same or similar to that of the embodiment of FIGS. 1–8 is omitted.

As noted above, the vehicle 1A shown in FIG. 9 basically has the same construction as the vehicle 1 illustrated in FIGS. 1–8. The vehicle 1A includes a vehicle body 3 supporting a handlebar 2 toward the front end thereof and is mounted for rotation about the handlebar axis. A tandem seat 4 is disposed at the rear of the vehicle body 3. A trunk space 5 is disposed below the tandem seat 4 and a drive unit 120 is disposed under the trunk space 5.

In this drive unit 120, the generator 60 is disposed above the engine 30 and the power distribution mechanism 50 and also below the tandem seat 4. The generator 60 is disposed, with its longitudinal direction approximately in agreement with the lateral direction of the vehicle 1A.

This arrangement provides a further advantage when used in a vehicle, such as the vehicle 1A, that does not already include sufficient space adjacent to the engine 30 to accommodate the generator 60. Such a limitation on space can result when the vehicle 1A includes a larger engine, for example, but without limitation an engine with multiple cylinders.

Thus, even where a vehicle such as the vehicle 1A includes a larger multi-cylinder engine, the overall width of the vehicle can be maintained at a minimum by disposing the generator 60 above the engine.

In some embodiments, where the engine 30 includes a higher number of cylinders and thus a higher output, the output of the motor 80 and the amount of power that can be generated by the generator 60 should also be increased. If the amount of power generation is increased, the diameter of the generator and particularly the diameter of its end face becomes larger, or the generator becomes longer in its longitudinal direction.

Thus, it is more desirable to use generators with smaller diameters in increased lengths. This is advantageous because in the arrangement illustrated in FIG. 9, the space above the engine 30 is longer (i.e., in the direction of the lateral width of the vehicle 1A). Additionally, by reducing the diameter of the generator 60, more space is available for the trunk 5. As a result, while the amount of power generation of the generator 60 can be increased, the lateral protrusion of the generator is minimized.

Although the illustrated embodiment is in the context of a scooter-type two-wheeled vehicle, the inventions disclosed herein are not limited to such an embodiment. Rather, the inventions disclosed herein can be applied to any two-wheeled vehicle, and more particularly, to such vehicles that can be powered by a generator which is driven by an engine.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A motorcycle comprising an engine, a generator configured to generate electricity, a drive wheel, a power distribution unit configured to selectively connect the crankshaft of the engine with the generator, the power distribution unit being configured to distribute drive force of the engine from the crankshaft to the generator and to the drive wheel, and a motor configured to rotate the drive wheel with electric power of the generator, wherein the crankshaft is disposed perpendicular to the direction of travel of the motorcycle, and at least one of the generator and the motor is disposed at a longitudinally different position on the motorcycle with respect to the power distribution unit.

2. The motorcycle of claim 1 additionally comprising a cylinder section of the engine and the generator are disposed adjacent to each other, at a forward side of the crankshaft in the direction of travel of the vehicle.

3. The motorcycle of claim 2, wherein a trunk space is provided in a space above the cylinder section of the engine, the generator, and the crankshaft.

4. The motorcycle of claim 3, wherein the generator is disposed at a lateral side of the motorcycle where power is transmitted from the power distribution unit through a belt or a chain.

5. The motorcycle of any one of claim 3, wherein the motor and the drive wheel are disposed coaxially, and ground clearances of a shaft of the drive wheel, the crankshaft and the shaft of the generator are approximately the same.

6. The motorcycle of claim 2, wherein the generator is disposed at a lateral side of the motorcycle where power is transmitted from the power distribution unit through a belt or a chain.

7. The motorcycle of any one of claim 2, wherein the motor and the drive wheel are disposed coaxially, and ground clearances of a shaft of the drive wheel, the crankshaft and the shaft of the generator are approximately the same.

8. The motorcycle of claim 1 additionally comprising a cylinder section of the engine disposed at a forward side of the crankshaft in the direction of travel of the vehicle, wherein the generator is disposed above the power distribution unit and below a seat section of the motorcycle.

9. The motorcycle of claim 8, wherein the generator is disposed at a lateral side of the motorcycle where power is transmitted from the power distribution unit through a belt or a chain.

10. The motorcycle of any one of claim 8, wherein the motor and the drive wheel are disposed coaxially, and ground clearances of a shaft of the drive wheel, the crankshaft and the shaft of the generator are approximately the same.

11. The motorcycle of claim 1, wherein the generator is disposed at a lateral side of the motorcycle where power is transmitted from the power distribution unit through a belt or a chain.

12. The motorcycle of any one of claim 1, wherein the motor and the drive wheel are disposed coaxially, and ground clearances of a shaft of the drive wheel, the crankshaft and the shaft of the generator are approximately the same.

13. The motorcycle of claim 12, wherein a cylinder of the engine is disposed with its cylinder axis disposed approximately horizontally.

14. The motorcycle of claim 1, further comprising a speed reducer configured to adjust drive forces from the engine and the motor and to transmit the drive forces to the shaft of the drive wheel, wherein the speed reducer is disposed downstream of the power distribution unit in a transmission path of the drive force from the engine to the shaft of the drive wheel.

15. A motorcycle comprising a power shaft rotated by an engine, a generator configured to generate electricity through rotation of the power shaft, a drive wheel driven through rotation of the power shaft, power distribution means disposed on the power shaft for selectively distributing drive force of the engine from the power shaft to the generator and to the drive wheel, and a motor configured to rotate the drive wheel with electric power of the generator, wherein the power shaft is disposed perpendicular to the direction of travel of the motorcycle, and at least one of the generator and the motor is disposed at a longitudinally different position on the motorcycle with respect to the power distribution means.

16. A motorcycle comprising a power shaft rotated by an engine, a generator configured to generate electricity through rotation of the power shaft, a drive wheel driven through rotation of the power shaft, a power distribution unit disposed on the power shaft and configured to distribute drive force of the engine from the power shaft to the generator and to the drive wheel, and a motor configured to rotate the drive wheel with electric power of the generator, wherein the power shaft is disposed perpendicular to the direction of travel of the motorcycle, and at least one of the generator and the motor is disposed at a longitudinally different position on the motorcycle with respect to the power distribution unit, wherein the entire generator is disposed forwardly from the power shaft.

17. The motorcycle of claim 16 additionally comprising a cylinder section of the engine and the generator are disposed adjacent to each other, at a forward side of the power shaft in the direction of travel of the vehicle.

18. The motorcycle of claim 17, wherein a trunk space is provided in a space above the cylinder section of the engine, the generator, and the power shaft.

19. The motorcycle of claim 16 additionally comprising a cylinder section of the engine disposed at a forward side of the power shaft in the direction of travel of the vehicle, wherein the generator is disposed above the power distribution unit and below a seat section of the motorcycle.

20. The motorcycle of claim 16, wherein the power shaft is a crankshaft of the engine.

* * * * *